United States Patent
Falardeau et al.

(10) Patent No.: US 6,629,157 B1
(45) Date of Patent: Sep. 30, 2003

(54) SYSTEM AND METHOD FOR VIRTUALIZING THE CONFIGURATION SPACE OF PCI DEVICES IN A PROCESSING SYSTEM

(75) Inventors: Brian D. Falardeau, Boulder, CO (US); David W. Nuechterlein, Longmont, CO (US); Christopher M. Herring, Longmont, CO (US); Jonathan B. White, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,322

(22) Filed: Jan. 4, 2000

(51) Int. Cl.[7] .............................................. G06F 9/455
(52) U.S. Cl. ........................................ 710/10; 703/25
(58) Field of Search .............................. 710/314, 8, 10, 710/104; 703/25; 713/100

(56) References Cited

U.S. PATENT DOCUMENTS

| | | | | |
|---|---|---|---|---|
| 5,751,975 A | * | 5/1998 | Gillespie et al. ............. | 710/315 |
| 5,796,984 A | * | 8/1998 | Pearce et al. ................. | 703/25 |
| 5,838,932 A | * | 11/1998 | Alzien ......................... | 710/314 |
| 5,859,987 A | * | 1/1999 | Gillespie et al. ............. | 710/311 |
| 5,884,027 A | * | 3/1999 | Garbus et al. ............... | 710/314 |
| 6,241,400 B1 | * | 6/2001 | Melo et al. .................. | 710/313 |
| 6,256,692 B1 | * | 7/2001 | Yoda et al. .................. | 710/104 |
| 6,366,877 B1 | * | 4/2002 | Nishino et al. ............... | 703/25 |
| 6,513,128 B1 | * | 1/2003 | Wang et al. ................. | 713/600 |

FOREIGN PATENT DOCUMENTS

JP      11288400 A  * 10/1999  ........... G06F/13/36

* cited by examiner

*Primary Examiner*—Paul R. Myers

(57) ABSTRACT

There is disclosed an apparatus for providing a virtual PCI device for use in a processing system comprising a data processor having an external peripheral bus coupled thereto in which peripheral devices associated with the external peripheral bus are controlled by accessing configuration circuitry associated with each of the peripheral devices. The apparatus comprises: a) an address trap circuit for detecting a configuration cycle accessing a virtual configuration address space associated with the virtual PCI device and generating an enable signal in response and b) an interrupt generation circuit associated with the address trap circuit that receives the enable signal and, in response, generates an interrupt signal that causes the data processor to execute instructions stored in system memory associated with the virtual device.

21 Claims, 3 Drawing Sheets

SYSTEM AND METHOD FOR VIRTUALIZING THE CONFIGURATION SPACE OF PCI DEVICES IN A PROCESSING SYSTEM

TECHNICAL FIELD OF THE INVENTION

The present invention is directed, in general, to processing systems and, more specifically, to a data processor coupled to one or more peripheral devices via a Peripheral Component Interconnect (PCI) bus.

BACKGROUND OF THE INVENTION

In order to extend the capabilities of data processing systems, particularly PCs, many microprocessor-based architectures implement a Peripheral Component Interconnect (PCI) bus that allows peripheral devices to be added to the system. Because of its relative ease of use and flexibility, the PCI bus has become one of the most popular electronic standards in history. The PCI bus forms the main general-purpose bus in nearly all PCs worldwide. For example, Microsoft® Windows® 32-bit operating systems use the PCI bus to gather data about peripheral devices attached to the PCI bus. This is particularly important with respect to the Plug and Play features of Windows®.

In addition to the conventional main memory and input/output (I/O) address spaces used by conventional microprocessors, every PCI device in a processing system, including PCI bridges, has a configuration data table somewhere in the PCI configuration address space. The PCI configuration header allows the processing system to identify and control the PCI device. The location of the PCI configuration header in the PCI configuration address space depends on the location of the PCI device on the PCI bus. For example, a PCI video card plugged into one PCI slot will have its configuration header in one location. If the PCI video card is plugged into another PCI slot, its configuration header will appear in another location in PCI configuration address space.

Configuration address space is a physical address unique to the PCI bus. Configuration cycles are generated in the microprocessor. The configuration registers of each PCI device are accessed through the PCI interface. The PCI interface uses two I/O locations at addresses 0CF8(hex) and 0CFC(hex). The 0CF8h address references the Configuration Address register. The 0CFCh address references the Configuration Data register. To access PCI configuration space, a data value is written to the Configuration Address register that specifies the PCI bus, the PCI device on that bus, the function number of the PCI device, and the configuration register in the PCI device that is being accessed. A subsequent read or write to the Configuration Data register causes the PCI bridge to translate the data value in the Configuration Address register in order to access the configuration register and the configuration memory for the PCI device. A configuration memory of 256 bytes is provided for each PCI device.

Motherboard devices, such as graphics or audio, may not implement configuration space in hardware in order to simplify the hardware design. Alternatively, a hardware implementation may not provide full functionality. Microsoft® Plug and Play features and WINDOWS 98® (operating system) multiple monitor capabilities require the use of PCI configuration space. The hardware for the PCI configuration space must be present even if, for example, multiple monitors are not used in the processing system.

Furthermore, some multifunction or programmable devices can be configured to represent any number of PCI device types. For example, a digital signal processor (DSP) board may be configured as an audio device, a video device, a modem, a data capture device, test equipment, or as some other function. Design flexibility is lost since the configuration space for the DSP board is implemented in hardware on the motherboard in the final product and cannot be changed.

Therefore, there is a need in the art for improved processing system architectures in which PCI bus requirements are more flexible. In particular, there is a need for improved processing systems that minimize the amount of hardware required to serve one or more PCI devices coupled to the PCI bus of the processing system. More particularly, there is a need for an improved processing system architecture in which operating system accesses to PCI devices that are not present on the PCI bus may be handled without utilizing special purpose configuration space hardware.

SUMMARY OF THE INVENTION

The limitations inherent in the prior art described above are overcome in the present invention which provides an apparatus for providing a virtual PCI device for use in a processing system comprising a data processor having an external peripheral bus coupled thereto in which peripheral devices associated with the external bus are controlled by accessing configuration circuitry associated with each of the peripheral devices. In an advantageous embodiment of the present invention, the apparatus for providing a virtual PCI device comprises: a) an address trap circuit capable of detecting a configuration cycle capable of accessing a virtual configuration address space associated with the virtual PCI device and, in response to the detection, generating an enable signal; and b) an interrupt generation circuit associated with the address trap circuit capable of receiving the enable signal, and in response thereto, generating an interrupt signal capable of causing the data processor to execute a plurality of instructions associated with the virtual device.

According to one embodiment of the present invention, the apparatus further comprises a memory associated with data processor capable of storing the plurality of instructions.

According to another embodiment of the present invention, the external bus comprises a Peripheral Component Interconnect (PCI) bus.

According to still another embodiment of the present invention, the address trap circuit and the interrupt generation circuit are disposed in a PCI bridge associated with the data processor.

According to yet another embodiment of the present invention, the PCI bridge is external to the data processor.

According to a further embodiment of the present invention, the PCI bridge is integrated into the data processor.

According to a still further embodiment of the present invention, at least one of the address trap circuit and the interrupt generation circuit is programmable, such that the interrupt signal is generated only for selected ones of bus numbers, and/or function numbers, and/or device numbers associated with the external bus.

According to a yet further embodiment of the present invention, the plurality of instructions are stored in system management mode address space in a memory associated with the data processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
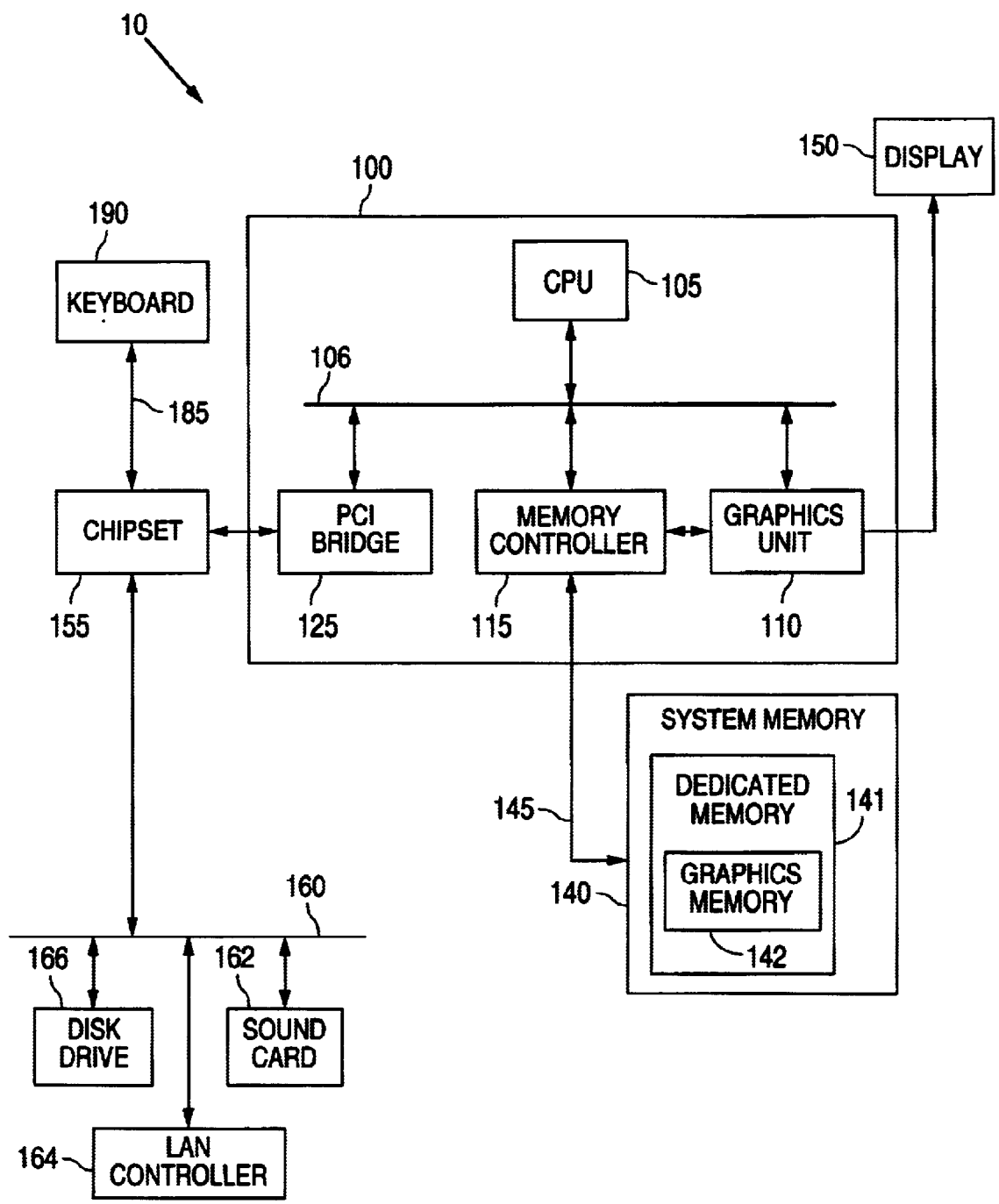
FIG. 1 illustrates an exemplary processing system which includes an exemplary integrated microprocessor according to one embodiment of the present invention.

FIG. 1 is a block diagram of processing system 10 of the present invention, which includes integrated microprocessor 100. Microprocessor 100 comprises central processing unit (CPU) 105, graphics unit 110; system memory controller 115, and PCI bridge 125, all of which are coupled to communication bus 106. Graphics unit 110 and system memory controller may be integrated onto the same die as microprocessor 100.

Integrated memory controller 115 bridges microprocessor 100 to system memory 140, and may provide data compression and/or decompression to reduce bus traffic over external memory bus 145. At least a portion of system memory 140 comprises dedicated memory 141, which includes graphics memory 142. Integrated graphics unit 110 may provide one or more of TFT, DSTN, RGB, and other types of video output to drive display 150. PCI bridge 125 connects integrated microprocessor 100 to chipset bridge 155. PCI bridge 125 may support the peripheral component interconnect (PCI) bus interface.

Chipset bridge 155 may provide a conventional peripheral component interconnect (PCI) bus interface to PCI bus 160, which connects chipset bridge 155 to one or more peripherals, such as sound card 162, LAN controller 164, and disk drive 166, among others. Chipset bridge 155 is also coupled to keyboard 190 through bus 185. In some embodiments, chipset bridge 155 may integrate local bus functions such as sound, disk drive control, modem, network adapter, and the like.

In some cases, it is possible that the operating system (OS) program (or, alternatively, an application program) executed by microprocessor 100 may attempt to access a PCI device that may not be implemented on PCI bus 160. For example, in a WINDOWS 98® (OS) program environment, a program that requires the multiple monitor capabilities of WINDOWS 98® (OS) may not be supported if there is not a PCI card and associated configuration space for each monitor that may be addressed by the program. Additionally, configuration space may not be present that is needed for access to Plug and Play devices. As explained below in greater detail, the present invention provides greater flexibility in the design of processing system architectures that implement PCI buses by trapping PCI configuration cycle to selected addresses in order to virtualize PCI configuration space. Thus, "virtual" PCI devices may be implemented in system memory, thereby resulting in less hardware for PCI configuration space and greater flexibility in the system design, particularly with respect to the PCI bus.

Figure 2:
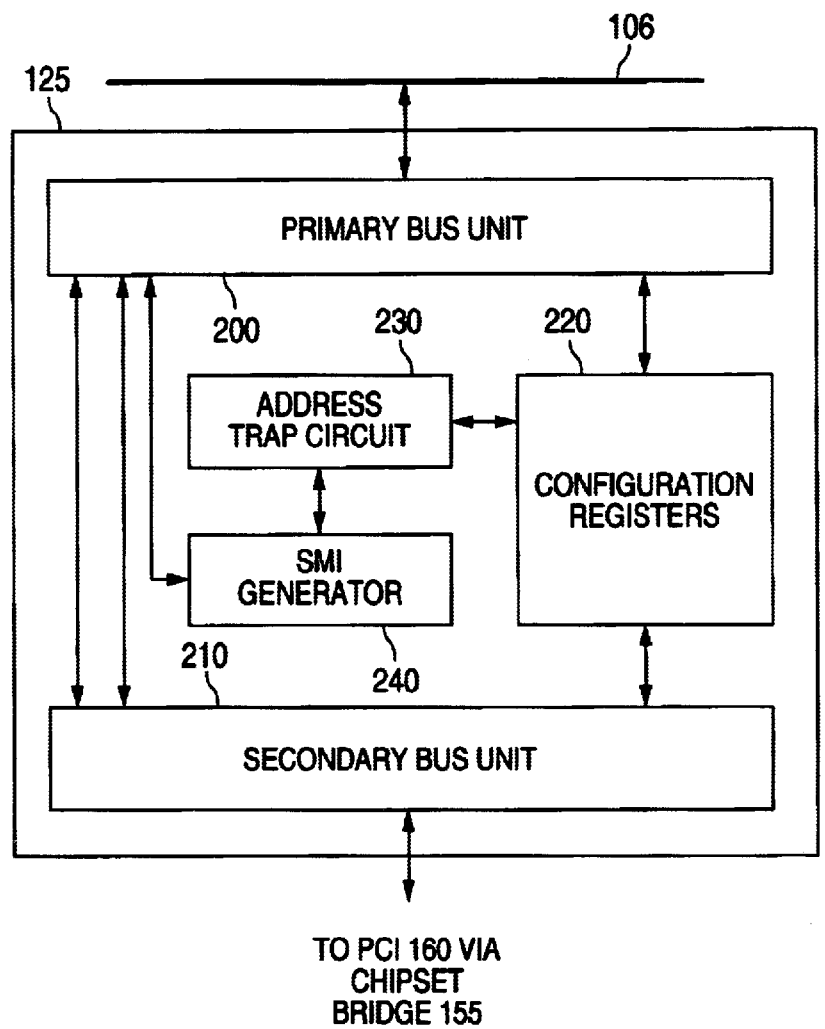
FIG. 2 illustrates an exemplary PCI bridge according to one embodiment of the present invention.

FIG. 2 illustrates exemplary PCI bridge 125 according to one embodiment of the present invention. PCI bridge 125 comprises primary bus unit 200, which connects to the CPU local bus and system memory 140 via communications bus 106, and secondary bus unit 210, which connects to PCI bus 160. PCI bridge 125 further comprises configuration registers 220, address trap circuit 230, and system management interrupt (SMI) generator 240.

PCI configuration cycles generated by an OS program or an application program executed by microprocessor 100 are received by primary bus unit 200 and are transferred to configuration registers 220. Configuration registers 220 are used to access the configuration registers, namely the Configuration Address register and the Configuration Data register, and the configuration memory of each PCI device on PCI bus 160. Address trap circuit 230 detects (traps) accesses to addresses 0CF8(hex), the Configuration Address register, and 0CFC(hex), the Configuration Data register.

When address trap circuit 230 traps the PCI configuration cycles to 0CFC (hex), an enable signal is sent to SMI generator 240, which responds by generating an SMI that is sent through primary bus unit 200 to CPU 105. An SMI is capable of causing CPU 105 to enter system management mode (SMM), which can be used for system power management functions and for software-transparent emulation of I/O processors. An exemplary processor capable of performing operating in such a system management mode is the Cyrix Corporation MediaGX® processor.

Figure 3:
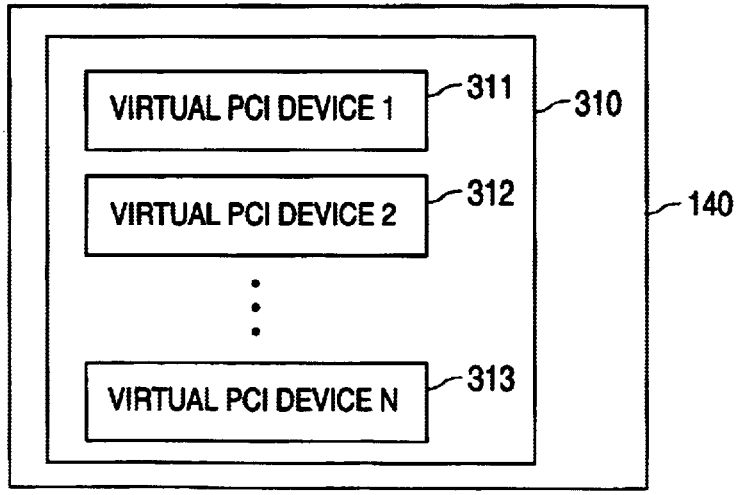
FIG. 3 illustrates an exemplary system memory suitable for implementing virtual PCI devices according to one embodiment of the present invention.

FIG. 3 illustrates exemplary system memory 140, which is suitable for implementing one or more virtual PCI devices according to one embodiment of the present invention. System memory 140 stores PCI virtual space 310, which comprises up to N system management mode (SMM) address spaces 311, 312, and 313. SMM address space 311, arbitrarily labeled "Virtual PCI Device 1," stores SMM code capable of emulating a virtual PCI device. Likewise, SMM address space 312, arbitrarily labeled "Virtual PCI Device 2," and SMM address space 313, arbitrarily labeled "Virtual PCI Device N," also store SMM code capable of emulating virtual PCI devices.

According to one embodiment of the present invention, the SMI generation may occur for all configuration cycles. According to an alternate embodiment of the present invention, address trap circuit 230 and SMI generator 240 are programmable, such that the SMI generation may occur only for selected bus, function, and device numbers. The SMM code maintains the configuration space for each virtual PCI device, returns data on read operations and programs the hardware as need on write operations. Write operations to configuration space of a virtual PCI device can change the base address for memory mapping. Write operations may also enable or disable memory and I/O decoding for the virtual PCI device.

Figure 4:
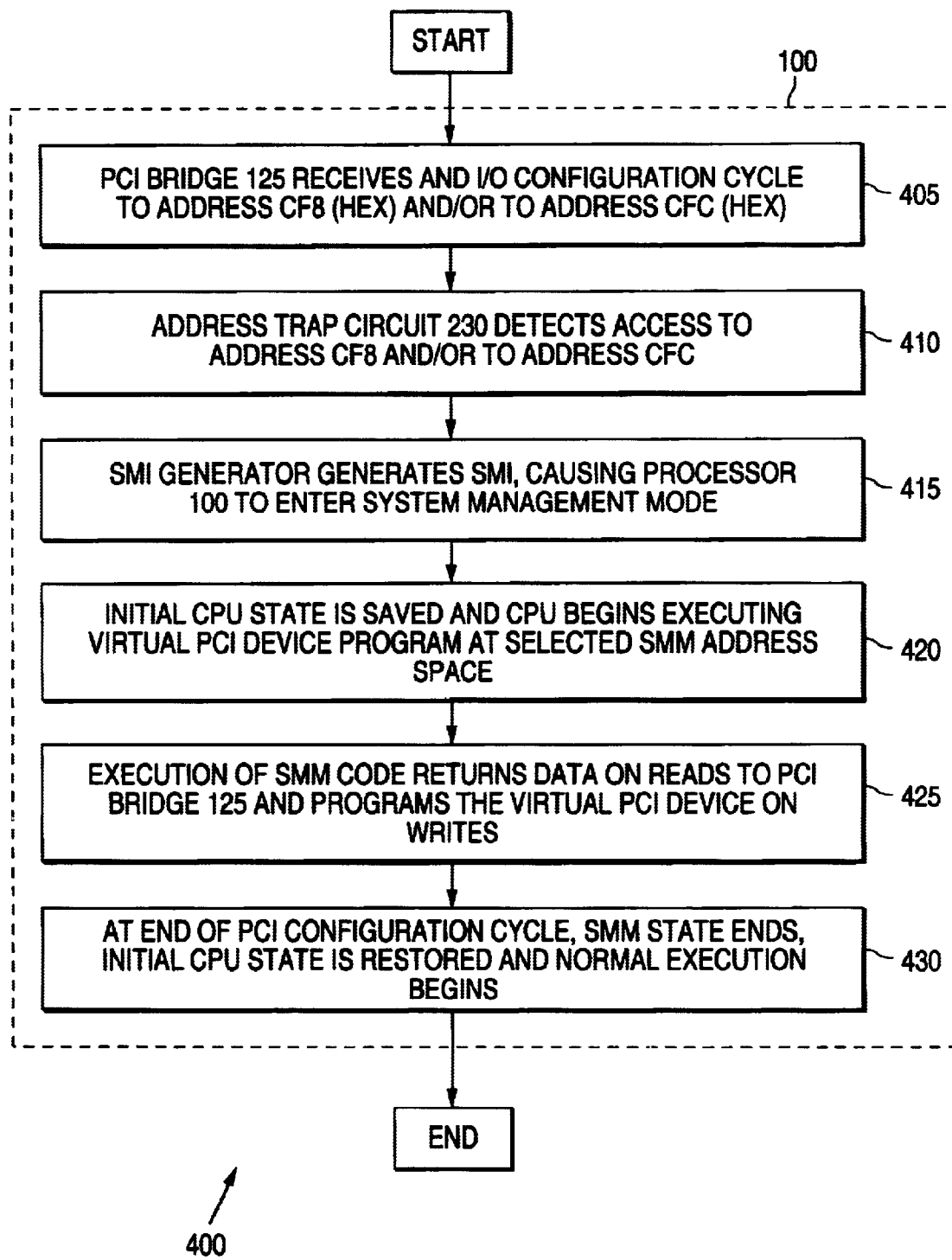
FIG. 4 is a flow diagram illustrating the operation of the exemplary processing system in FIG. 1 according to one embodiment of the present invention.

FIG. 4 depicts flow diagram 400, which illustrates the operation of exemplary processing system 10 and microprocessor 100 according to one embodiment of the present invention. Initially, PCI bridge 125 receives an input/output (I/O) configuration cycle to address 0CF8 (hex) and/or address 0CFC (hex) (process step 405). Address trap circuit 230 detects the access by the configuration cycle to address 0CF8 (hex) or address 0CFC (hex) and generates an enable signal that is sent to SMI generator 240 (process step 410).

In response to the enable signal, SMI generator 240 generates a system management interrupt that causes processor 100 to enter system management mode (process step 415). In system management mode, the state of CPU 105 is saved to memory and CPU 105 begins to execute the SMM code associated with the virtual PCI device that was addressed by the data stored or read during the configuration cycle to addresses 0CF8 and 0CFC (hex) (process step 420). Execution of the SMM code for the virtual device returns data on read cycles to PCI bridge 125 and programs the PCI virtual device on write cycles (process step 425). The PCI configuration cycle ends when execution of the SMM code is complete, there by terminating the SMM state. At that point, the initial state of CPU 105 is restored from memory and execution resumes at the point at which the SMI interrupted the normal execution flow (process step 430).

Although the foregoing text describes an embodiment of the present invention in which chipset bridge 155 is external to microprocessor 100, those skilled in the art will understand that this is by way of illustration only. The PCI embodiment described above should not be construed so as to limit the scope of the present invention in any way. In fact, in alternate embodiments of the present invention, chipset bridge 155 may be implemented as an integral part of microprocessor 100.

Furthermore, the principles of the present invention need not be limited to PCI bus architectures. Virtual bus devices according to the present invention may be implemented in association with any external bus architecture in which the external bus may be controlled (or mastered) by a peripheral device coupled to that external bus and configuration hardware space is used to control peripheral devices. In particular, the present invention may implemented in connection with the local bus of the core of CPU 105 in microprocessor 100, in PCI bridge 125, and in chipset bridge 155 associated with said processor.

Although the present invention has been described in detail, those skilled in the art should understand that they can make various changes, substitutions and alterations herein without departing from the spirit and scope of the invention in its broadest form.

What is claimed is:

1. For use in a processing system comprising a data processor having an external peripheral bus coupled thereto in which peripheral devices associated with said external peripheral bus are controlled by accessing configuration circuitry associated with each of said peripheral devices, an apparatus for providing a virtual peripheral device that is capable of emulating a peripheral device that is not implemented on said external peripheral bus, said apparatus comprising:

an address trap circuit capable of detecting a configuration cycle capable of accessing a virtual configuration address space associated with said virtual peripheral device and, in response to said detection, generating an enable signal; and an interrupt generation circuit associated with said address trap circuit capable of receiving said enable signal, and in response thereto, generating an interrupt signal capable of causing said data processor to execute a plurality of instructions associated with said virtual device to emulate said peripheral device that is not implemented on said external peripheral bus.

2. The apparatus as set forth in claim 1 further comprising a memory associated with said data processor capable of storing said plurality of instructions for emulating said peripheral device that is not implemented on said external peripheral bus.

3. The apparatus as set forth in claim 1 wherein said external peripheral bus comprises a Peripheral Component Interconnect (PCI) bus.

4. The apparatus as set forth in claim 3 wherein said address trap circuit and said interrupt generation circuit are disposed in one of a PCI bridge associated with said data processor, a CPU core associated with said processor, and a chipset bridge associated with said processor.

5. The apparatus as set forth in claim 4 wherein said PCI bridge is external to said data processor.

6. The apparatus as set forth in claim 4 wherein said PCI bridge is integrated into said data processor.

7. The apparatus as set forth in claim 4 wherein at least one of: said address trap circuit and said interrupt generation circuit is programmable, such that said interrupt signal is generated only for selected ones of bus numbers, function numbers, and device numbers associated with said external peripheral bus.

8. The apparatus as set forth in claim 1 wherein said plurality of instructions for emulating said peripheral device that is not implemented on said external peripheral bus are stored in system management mode address space in a memory associated with said data processor.

9. A processing system comprising:

a data processor having an external peripheral bus coupled thereto in which peripheral devices associated with said external peripheral bus are controlled by accessing configuration circuitry associated with each of said peripheral devices;

a memory coupled to said data processor; and an apparatus for providing a virtual peripheral device that is capable of emulating a peripheral device that is not implemented on said external peripheral bus, said apparatus comprising:

an address trap circuit capable of detecting a configuration cycle capable of accessing a virtual configuration address space associated with said virtual peripheral device and, in response to said detection, generating an enable signal; and an interrupt generation circuit associated with said address trap circuit capable of receiving said enable signal, and in response thereto, generating an interrupt signal capable of causing said data processor to execute a plurality of instructions associated with said virtual device to emulate said peripheral device that is not implemented on said external peripheral bus.

10. The processing system as set forth in claim 9 wherein said plurality of instructions for emulating said peripheral device that is not implemented on said external peripheral bus are stored in said memory.

11. The processing system as set forth in claim 9 wherein said external peripheral bus comprises a Peripheral Component Interconnect (PCI) bus.

12. The processing system as set forth in claim 11 wherein said address trap circuit and said interrupt generation circuit are disposed in one of a PCI bridge associated with said data processor, a CPU core associated with said processor, and a chipset bridge associated with said processor.

13. The processing system as set forth in claim 12 wherein said PCI bridge is external to said data processor.

14. The processing system as set forth in claim 12 wherein said PCI bridge is integrated into said data processor.

15. The processing system as set forth in claim 12 wherein at least one of: said address trap circuit and said interrupt generation circuit is programmable, such that said interrupt signal is generated only for selected ones of bus numbers, function numbers, and device numbers associated with said external peripheral bus.

16. The processing system as set forth in claim 9 wherein said plurality of instructions for emulating said peripheral device that is not implemented on said external peripheral bus are stored in system management mode address space in said memory.

17. For use in a processing system comprising a data processor having an external peripheral bus coupled thereto in which peripheral devices associated with the external peripheral bus are controlled by accessing configuration circuitry associated with each of the peripheral devices, a method for providing a virtual peripheral device that is capable of emulating a peripheral device that is not implemented on said external peripheral bus, said method comprising the steps of:

detecting a configuration cycle capable of accessing a virtual configuration address space associated with the virtual peripheral device; and in response to the detection, generating an interrupt signal capable of causing the data processor to execute a plurality of instructions associated with the virtual device to emulate said peripheral device that is not implemented on said external peripheral bus.

18. The method as set forth in claim 17 wherein the plurality of instructions for emulating said peripheral device that is not implemented on said external peripheral bus are stored in a memory associated with the processor.

19. The method as set forth in claim 18 wherein the plurality of instructions for emulating said peripheral device that is not implemented on said external peripheral bus are stored in system management mode address space in the memory.

20. The method as set forth in claim 17 wherein the external peripheral bus comprises a Peripheral Component Interconnect (PCI) bus.

21. The method as set forth in claim 17 wherein the steps of generating an interrupt signal is preformed only for selected ones of bus numbers, function numbers, and device numbers associated with the external peripheral bus.

* * * * *